United States Patent
Valecha et al.

(10) Patent No.: US 11,190,522 B2
(45) Date of Patent: Nov. 30, 2021

(54) ACCESS DELEGATION USING OFFLINE TOKEN

(71) Applicant: International Business Machines Corporation, Armonk, NY (US)

(72) Inventors: Vinod A. Valecha, Pune (IN); Nishant Singhai, Pune (IN); Sanjay B. Panchal, Mumbai (IN); Vikram Subhash Khopade, Pune (IN)

(73) Assignee: International Business Machines Corporation, Armonk, NY (US)

( * ) Notice: Subject to any disclaimer, the term of this patent is extended or adjusted under 35 U.S.C. 154(b) by 226 days.

(21) Appl. No.: 16/511,056

(22) Filed: Jul. 15, 2019

(65) Prior Publication Data
US 2021/0021601 A1    Jan. 21, 2021

(51) Int. Cl.
*H04L 29/06* (2006.01)
*H04L 9/32* (2006.01)
*H04L 9/08* (2006.01)

(52) U.S. Cl.
CPC .......... *H04L 63/102* (2013.01); *H04L 9/0872* (2013.01); *H04L 9/3213* (2013.01); *H04L 63/101* (2013.01); *H04L 63/105* (2013.01)

(58) Field of Classification Search
CPC ... H04L 63/102; H04L 9/3213; H04L 63/101; H04L 63/105; H04L 9/0872; H04L 63/0884; H04L 9/08; H04L 29/06
See application file for complete search history.

(56) References Cited

U.S. PATENT DOCUMENTS

| | | | |
|---|---|---|---|
| 7,010,600 B1 * | 3/2006 | Prasad | H04L 63/0815 709/223 |
| 9,418,213 B1 * | 8/2016 | Roth | H04L 63/105 |

(Continued)

FOREIGN PATENT DOCUMENTS

IN    201811010081 A    4/2018

OTHER PUBLICATIONS

Gomi, Hidehito; "Dynamic Identity Delegation Using Access Tokens in Federated Environments", 2011, IEEE, pp. 612-619. (Year: 2011).*

(Continued)

*Primary Examiner* — Matthew Smithers
(74) *Attorney, Agent, or Firm* — Stosch Sabo

(57) ABSTRACT

Described herein are techniques for delegating access using an offline token. The techniques including a method comprising receiving, at a server and from a delegate user device, a delegate login package comprising an offline token and delegate credentials. The offline token is generated at an offline user device and transmitted to the delegate user device for enabling the delegate user device to access access-controlled content associated with the offline user device. The techniques further include validating, by the server, the delegate login package by comparing the delegate credentials with delegate information stored in the offline token. The techniques further including establishing a delegated session between the delegate user device and the access-controlled content stored on the server in response to validating the delegate login package. Furthermore, the delegated session is established according to an access policy, delegation rights, and an expiration parameter stored in the offline token.

20 Claims, 4 Drawing Sheets

(56) References Cited

U.S. PATENT DOCUMENTS

| | | | |
|---|---|---|---|
| 9,497,165 B2* | 11/2016 | Keohane | H04L 63/0227 |
| 10,237,278 B1 | 3/2019 | Saylor et al. | |
| 10,911,428 B1* | 2/2021 | Roth | H04L 63/10 |
| 2006/0015725 A1 | 1/2006 | Voice et al. | |
| 2011/0321147 A1 | 12/2011 | Chakra et al. | |
| 2012/0102566 A1* | 4/2012 | Vrancken | G06F 21/335 |
| | | | 726/20 |
| 2012/0317624 A1* | 12/2012 | Monjas Llorente | H04L 63/105 |
| | | | 726/4 |
| 2013/0132232 A1* | 5/2013 | Pestoni | G06F 21/10 |
| | | | 705/26.25 |
| 2014/0365781 A1* | 12/2014 | Dmitrienko | G06F 21/34 |
| | | | 713/185 |
| 2017/0257377 A1* | 9/2017 | Vading | H04L 63/108 |
| 2018/0337924 A1 | 11/2018 | Graham et al. | |
| 2019/0080075 A1* | 3/2019 | Ekberg | H04L 9/0891 |
| 2019/0251281 A1* | 8/2019 | Freedman | G06F 21/62 |
| 2019/0286804 A1* | 9/2019 | Chacko | G06F 21/44 |
| 2019/0332808 A1* | 10/2019 | Dunjic | H04L 63/08 |
| 2020/0162461 A1* | 5/2020 | Blankinship | H04L 63/104 |
| 2020/0213310 A1* | 7/2020 | Ju | G06Q 20/3821 |

OTHER PUBLICATIONS

IBM, "A Secure, Simple, Cheap and Sharable mechanism for Authentication", An IP.com Prior Art Database Technical Disclosure, IP.com No. IPCOM000179305D, IP.com Electronic Publication Date: Feb. 12, 2009, 4 pages.

Unknown, "Online & Mobile Banking", Old National, printed Jul. 15, 2019, 3 pages, <https://www.oldnational.com/personal/bank/shared-access>.

Oracle, "Using a Middle Tier Server for Proxy Authentication", Database Security Guide, printed Jul. 15, 2019, 53 pages, <https://docs.oracle.com/cd/E11882_01/network.112/e36292/authentication.htm#DBSEG33101>.

Sharma, D., "Can your family members access your bank account during a crisis? Here's what you need to know and do", Updated: Oct. 30, 2017, 33 pages, <https://economictimes.indiatimes.com/wealth/save/understanding-the-operations-of-a-savings-bank-account/articleshow/61286259.cms?from=mdr>.

* cited by examiner

ACCESS DELEGATION USING OFFLINE TOKEN

BACKGROUND

The present disclosure relates to access delegation, and, more specifically, to delegating access to an account from an offline device.

Delegation is the process of a first user providing their authentication credentials for a computer, system, application, or program to a second user in order for the second user to access the computer, system, application, or program using the authentication credentials of the first user. Delegation may allow the second user to retrieve data and/or perform operations on behalf of the first user in situations where there is insufficient time for the first user to retrieve the data and/or to perform the operations, or in situations where there is insufficient time for the second user to properly receive modified access rights.

SUMMARY

Aspects of the present disclosure are directed toward a computer-implemented method comprising receiving, at a server and from a delegate user device, a delegate login package comprising an offline token and delegate credentials, where the offline token is generated at an offline user device and transmitted to the delegate user device for enabling the delegate user device to access access-controlled content associated with the offline user device. The method further comprises validating, by the server, the delegate login package by comparing the delegate credentials with delegate information stored in the offline token. The method further comprises establishing a delegated session between the delegate user device and the access-controlled content stored on the server in response to validating the delegate login package, where the delegated session is established according to an access policy, delegation rights, and an expiration parameter stored in the offline token.

Additional aspects of the present disclosure are directed to systems and computer program products configured to perform the method described above. The present summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
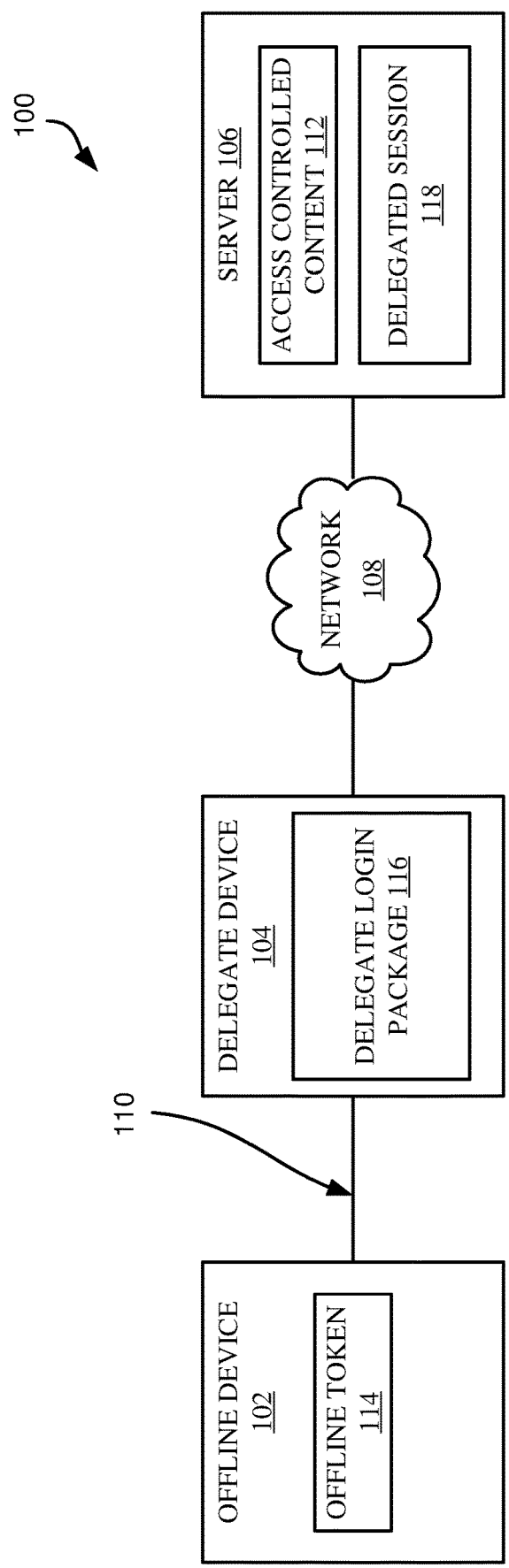
FIG. 1 illustrates a diagram of an example computer environment for generating and utilizing an offline token for access delegation, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward access delegation, and, more specifically, to delegating access to an account from an offline device. While not limited to such applications, embodiments of the present disclosure may be better understood in light of the aforementioned context.

Delegation is the process of a first user providing their authentication credentials for a computer, system, application, or program to a second user in order for the second user to access the computer, system, application, or program using the authentication credentials of the first user. Disadvantageously, when utilizing delegation, the second user may have unfettered access to all aspects of the account of the first user. This may allow the second user to intentionally or incidentally consume private or sensitive information such as, for example, financial information, health information, and/or other information. Furthermore, delegated access such as the unfettered access described above may allow the second user to intentionally or inadvertently modify aspects of the account of the first user. For example, if the first user requests that the second user change the password and enroll in two-factor authentication, the second user may do so, and in doing so, also accidentally change a home address of the first user.

For these reasons, there is a need for a time-controlled, access-controlled, and rights-controlled mechanism for enabling a second user to login to an account of a first user for a first application, where the first user does not have connectivity to the server associated with the first application, and where the first user does not need to provide a password or security question answer to the second user as part of the delegation.

Aspects of the present disclosure are directed to satisfying the above-described technological challenge. Aspects of the present disclosure are directed to generating a security token using an offline device, where the security token identifies a delegate (e.g., the second user), includes access credentials for an account of the first user, is associated with an expiration, defines access controls (e.g., what is visible vs. hidden), and defines delegation rights (e.g., a customized authority policy related to what the delegate can modify, change, implement, execute, etc.). The first user can provide the generated security token from the offline device to the delegate's device using another means of communication such as, for example, text message, phone call, short-range network, or another device-to-device communication mechanism. The delegate's device (which can access the server hosting the application) can then login to the account of the first user by using the generated security token without knowing the login credentials of the first user. The resulting delegated session in which the delegate acts on behalf of the first user can have defined access controls, defined delegation rights, and a defined expiration.

Thus, the present disclosure provides numerous advantages over the state of the art. For example, aspects of the present disclosure remove the need for a user to provide reusable access credentials (e.g., a login and password) to another user as part of delegation. These aspects of the present disclosure improve security insofar as any access credentials stored in the generated security token are encrypted and cannot be viewed by the delegate. As another example, aspects of the present disclosure can customize the delegated session insofar as the generated security token can define access controls, delegation rights, and/or an expiration. Thus, aspects of the present disclosure can tailor a delegated session according to the reason for the delegation.

The aforementioned advantages (and any other advantages discussed in the present disclosure) are example advantages, and embodiments of the present disclosure can exist that realize all, some, or none of any of the discussed advantages while remaining within the spirit and scope of the present disclosure.

Referring now to FIG. 1, illustrated is a diagram of an example computer environment 100 for generating and utilizing an offline token for access delegation, in accordance with some embodiments of the present disclosure.

The computing environment 100 can include offline device 102 communicatively coupled to delegate device 104. The delegate device 104 can be communicatively coupled to server 106 using network 108. As shown in FIG. 1, offline device 102 is not connected to network 108, and, thus, offline device 102 does not have access to server 106.

Nonetheless, offline device 102 is connected to delegate device 104 by a connection mechanism 110 such as a phone connection (e.g., able to communicate by voice, text, or another offline messaging application), a short-range network connection (e.g., networks utilizing Institute of Electrical and Electronics Engineers (IEEE) 802.15 standards, IEEE 1902.1 standards, personal-area networks (PAN), Bluetooth™ networks, Near Field Communication (NFC) networks, Infrared Data Association (IrDA) networks, Internet Protocol version 6 (IPv6) over Low-Power Wireless Personal-Area Networks (6LoWPAN), DASH7 Alliance Protocol (D7A) networks, RuBee networks, Ultra-wideband (UWB) networks, Frequency Modulation (FM)-UWB networks, Wireless Ad Hoc Networks (WANET), Z-Wave networks, ZigBee™ networks, and other short-range networks), or another connection enabling two user devices to communicate information.

In some embodiments, offline device 102 may desire to interface with server 106 in order to view, modify, or otherwise utilize access-controlled content 112. Access-controlled content 112 can be any online user account such as, for example, an online financial account (e.g., online banking, online brokerage, etc.), an email account, a cloud-based storage account, a work-based account, or any other online user account. However, since offline device 102 lacks connection to network 108, offline device 102 cannot login to server 106 to interact with access-controlled content 112. In this situation, the offline device 102 may choose to delegate access rights to a delegate such as delegate device 104.

In order to delegate access to access-controlled content 112, offline device 102 can generate offline token 114. Offline token 114 is referred to as "offline" insofar as offline token 114 can be generated without access to server 106. In other words, offline token 114 can be generated using information exclusively stored in, input to, or otherwise residing within offline device 102. Offline device 102 can provide offline token 114 to delegate device 104 using communication mechanism 110. Delegate device 104 can then interface with server 106 via network 108 to provide a delegate login package 116 to server 106. The delegate login package 116 can include the offline token 114 and information related to delegate device 104. The server 106 can evaluate the delegate login package 116 and, if the delegate login package 116 is validated, initiate a delegated session 118 providing delegate device 104 limited access to access-controlled content 112. Delegated session 118 can provide limited access insofar as limiting viewable content, limiting executable operations, and/or limiting usage.

Offline device 102 and delegate device 104 can be any user devices including, but not limited to, smartphones, cell phones, tablets, laptops, desktops, smartglasses, smartwatches, and/or other electronic devices having user interfaces and capable communicating with another electronic device.

Server 106 can be any physical or virtual server configured to store data and provide data to one or many user devices on an as-needed basis using network 108. Network 108 can be, for example, the Internet, an intranet, a local area network (LAN), a wide area network (WAN), a cellular network, or a different network configuration.

Figure 2A:
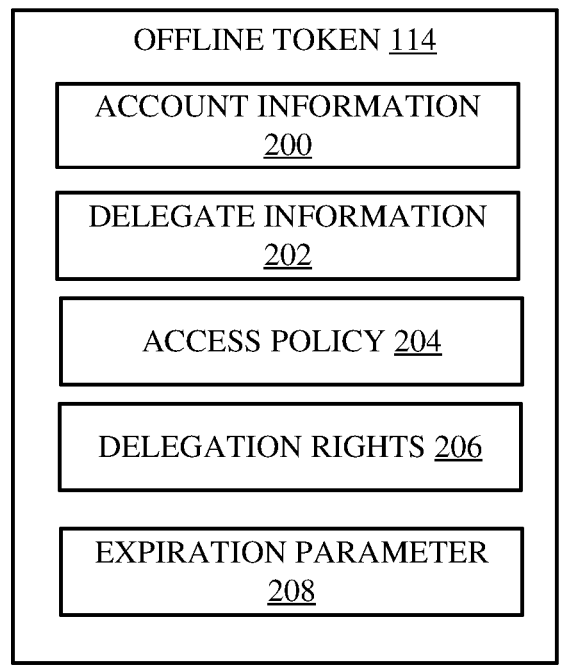
FIG. 2A illustrates a block diagram of an example offline token, in accordance with some embodiments of the present disclosure.

Referring now to FIG. 2A, illustrated is a block diagram of an example offline token 114, in accordance with some embodiments of the present disclosure. Offline token 114 can include account information 200, delegate information 202, access policy 204, delegation rights 206, and/or expiration parameter 208.

Account information 200 can refer to account information associated with the offline device 102 and the access-controlled content 112. For example, account information 200 can include information for identifying a user profile associated with access-controlled content 112 (e.g., sign-in name, login, account number, account identifier, name, address, social security number, or the like) and a password associated with the user profile. The password can be an alphanumeric password, a biometric password (e.g., face-based, fingerprint-based, voice-based, etc.), or a different password capable of being input to offline device 102 while generating offline token 114.

Delegate information 202 can refer to information associated with the delegate that will be accessing access-controlled content 112 on behalf of the offline device 102. Delegate information 202 can include, for example, a name, a login, an address, an account number, a phone number, an email address, and the like. In some embodiments, the delegate information 202 includes an indication of a type of relationship between the requestor and the delegate (e.g., family member, friend, coworker, acquaintance, etc.). In some embodiments, the delegate information 202 includes a purpose for which the delegate is accessing the access-controlled content 112 (e.g., to change a password, to update an address, to lock an account, to perform a transaction, etc.).

Access policy 204 includes parameters defining viewable information of access-controlled content 112 that is visible to the delegate device 104 in the delegated session 118. For example, some content can be redacted, covered, scrambled, hidden, anonymized, or otherwise limited. Such content can relate to non-essential information in light of the purpose of the delegation. For example, if the delegate device 104 is utilizing access-controlled content 112 on behalf of offline device 102 in order to change a password for offline device 102, then the delegate device 104 does not need to view information such as account balances, recent transactions, messages, and the like.

Delegation rights 206 includes parameters defining operations that delegate device 104 is allowed to perform on access-controlled content 112 on behalf of offline device 102. Delegation rights 206 can define permissions related to modifying information (e.g., changing passwords), executing operations (e.g., performing transactions), enrolling/disenrolling from services, sending messages, deleting messages, and the like.

Expiration parameter 208 can comprise a time-based expiration, a location-based expiration, and/or a usage-based expiration. Expiration parameter 208 can refer to an amount of time until expiration or a future date and time of an expiration. In some embodiments, the expiration parameter 208 is location-based rather than time-based (e.g., a geofence surrounding offline device 102 so that delegate device 104 must stay within a predefined distance of offline device 102 during the delegated session 118). In some embodiments, the expiration parameter 208 is usage-based rather than time-based (e.g., delegated session 118 terminates after a password-change operation is completed).

In some embodiments, offline token 114, including one or more of account information 200, delegate information 202, access policy 204, delegation rights 206, and/or expiration parameter 208 is encrypted to improve security prior to transmitting offline token 114 from offline device 102 to delegate device 104. Any number of encryption protocols, now known or subsequently developed, can be used in accordance with the spirit and scope of the present disclosure. In embodiments where the offline token 114 is encrypted, the server 106 contains a key, shared secret, or other information enabling server 106 to decrypt offline token 114.

Figure 2B:
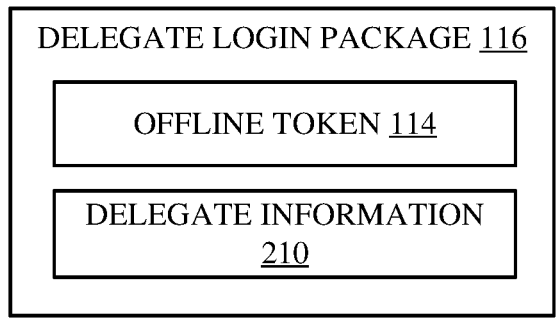
FIG. 2B illustrates a block diagram of an example delegate login package, in accordance with some embodiments of the present disclosure.

Referring now to FIG. 2B, illustrated is a block diagram of an example delegate login package 116, in accordance with some embodiments of the present disclosure. Delegate login package 116 can include offline token 114 and delegate information 210, where the delegate information 210 can be provided to delegate device 104 at the time of generating the delegate login package 116. Delegate information 210 shown in FIG. 2B can be similar to (but is not necessarily identical to) the delegate information 202 that can be associated with offline token 114. Delegate information 210 can include, for example, a name, a login, an address, an account number, a phone number, an email address, and the like.

The delegate login package 116 can include delegate information 210 together with offline token 114 so that the server 106 can verify the delegate information 210 provided at the delegate device 104 matches the relevant portions of delegate information 202 provided by offline device 102 when generating offline token 114. In other words, in some embodiments, the delegate information 202 is not visible at delegate device 104, thereby protecting the access-controlled information 112 in the event that the offline token 114 is intercepted by a malicious actor during transmission over the connection mechanism 110.

Figure 3:
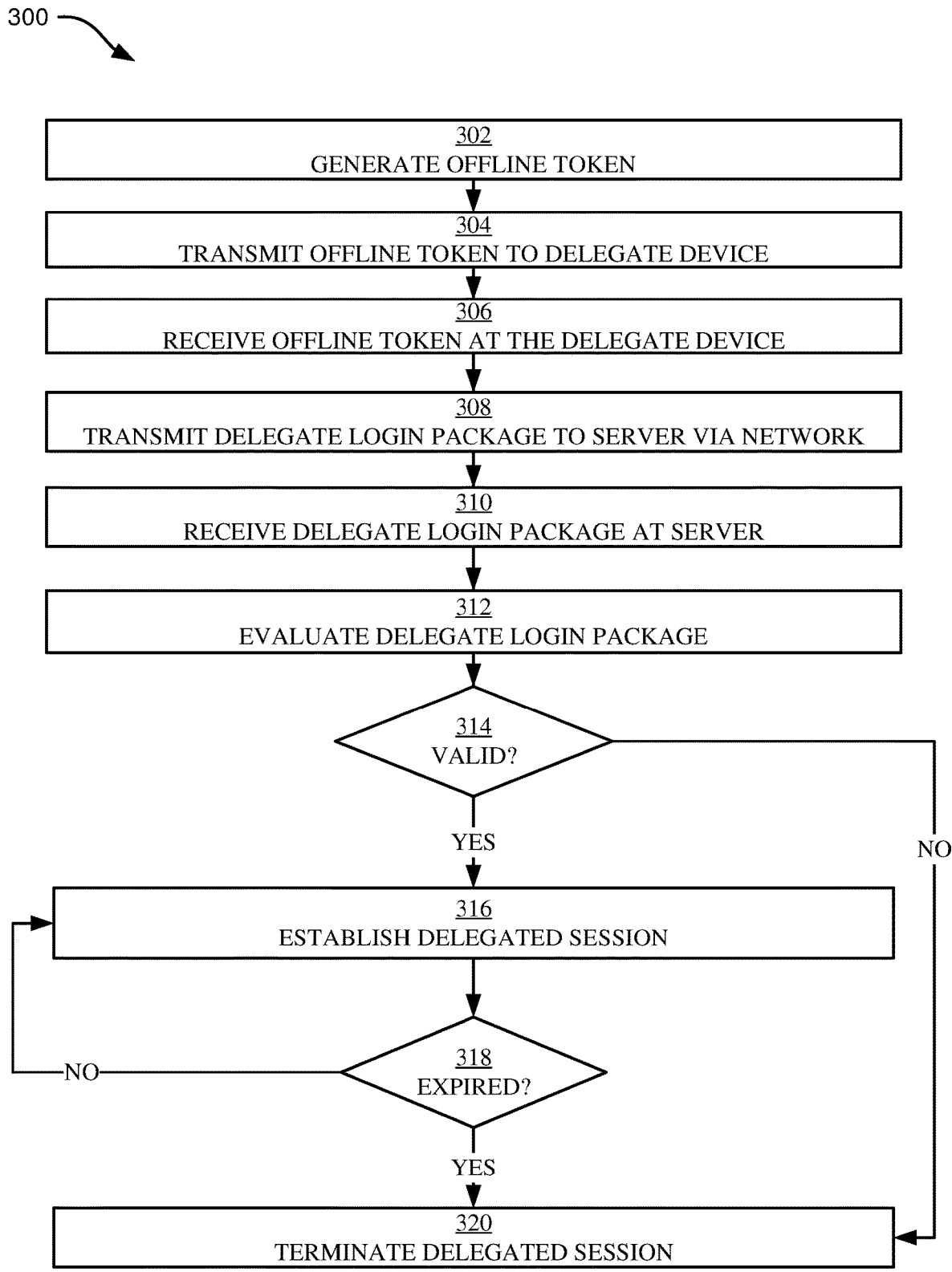
FIG. 3 illustrates a flowchart of an example method for generating and utilizing an offline token for access delegation, in accordance with some embodiments of the present disclosure.

Referring now to FIG. 3, illustrated is a flowchart of an example method 300 for implementing a delegated session 118 using an offline token 114, in accordance with some embodiments of the present disclosure. The method 300 can be implemented by one or more of offline device 102, delegate device 104, and/or server 106.

Operation 302 includes generating an offline token 114. The offline device 102 can generate the offline token 114, where the offline device 102 lacks connectivity to access-controlled content 112 stored on server 106. The offline token 114 can be generated based on user input to offline device 102, where the user input can be related to account information 200, delegate information 202, access policy 204, delegation rights 206, and/or an expiration parameter 208. In some embodiments, an application executing on offline device 102 generates the offline token 114. Further, the offline token 114 can be configured to interact with server 106 in order to enable server 106 to delegate access to access-controlled content 112 to delegate device 104. In some embodiments, operation 302 further includes encrypting offline token 114 (or a portion of the offline token 114) in order to improve security. In such embodiments, server 106 is configured to decrypt the offline token 114.

Operation 304 includes transmitting the offline token 114 to the delegate device 104 using a connection mechanism 110. The connection mechanism 110 can be, for example, a phone call, a text message, a short-range network, a hardwired connection, or the like.

Operation 306 includes receiving the offline token 114 at the delegate device 104. Operation 308 includes transmitting a delegate login package 116 from the delegate device 104 to the server 106 storing the access-controlled content 112. The delegate login package 116 can include, for example, the offline token 114 together with delegate information 210. In some embodiments, operation 308 transmits information input to a webpage providing a user interface to server 106.

Operation 310 includes receiving the delegate login package 116 at the server 106. Operation 312 includes evaluating the delegate login package 116 by the server 106. In embodiments where the offline token 114 is encrypted, operation 312 can include decrypting the offline token 114. Server 106 can verify, for example, that the delegate information 202 stored in offline token 114 matches the delegate information 210 provided in the delegate login package 116 from the delegate device 104.

Operation 314 includes determining if the delegate login package 116 constitutes a valid delegated login. If not (314: NO), the method 300 proceeds to operation 320 and terminates the delegated session 118 (e.g., ends the session before it starts). If so, (314: YES), the method 300 proceeds to operation 316 and establishes a delegated session 118. Delegated session 118 can be a login by delegate device 104 to access-controlled content 112 on behalf of offline device 102 that can be limited in scope (e.g., limited accessibility to information, limited ability to execute operations on the available information, etc.) and can be associated with an expiration. In some embodiments, once the delegated session 118 is established in operation 316, the delegate device 104 can read data, retrieve data, download content, upload content, and/or perform operations on access-controlled content 112 on behalf of offline device 102.

Operation 318 includes determining if the delegated session 118 is expired. Determining if the delegated session 118 is expired can include comparing an expiration parameter 208 to a current parameter. For example, if the expiration parameter 208 relates to a time, operation 318 can compare the time in expiration parameter 208 to a current time (where the delegated session 118 can be expired in response to the current time exceeding the time in the expiration parameter 208). As another example, if the expiration parameter 208 relates to a geographic region, operation 314 can compare a current location to the geographic region (where the delegated session 118 can be expired in response to the current location being outside the geographic region in the expiration parameter 208). As another example, if the expiration parameter 208 relates to a usage, operation 318 can compare a log of operations in delegated session 118 to the usage (where the delegated session 118 can be expired in response to the log of operations containing an operation satisfying a usage defined in the expiration parameter 208). Regardless of the type of expiration parameter 208, if the delegated session 118 is not expired (318: NO), the method 300 returns to operation 316 and maintains the delegated session 118. If the delegated session 118 is expired (318: YES), the method 300 proceeds to operation 320 and terminates the delegated session 118. Terminating the delegated session 118 can include logging out the delegate device 104 from the server 106 so that the delegate device 104 no longer has access to the access-controlled content 112. Furthermore, in some embodiments, terminating the delegated session 118 includes destroying the offline token 114.

Figure 4:
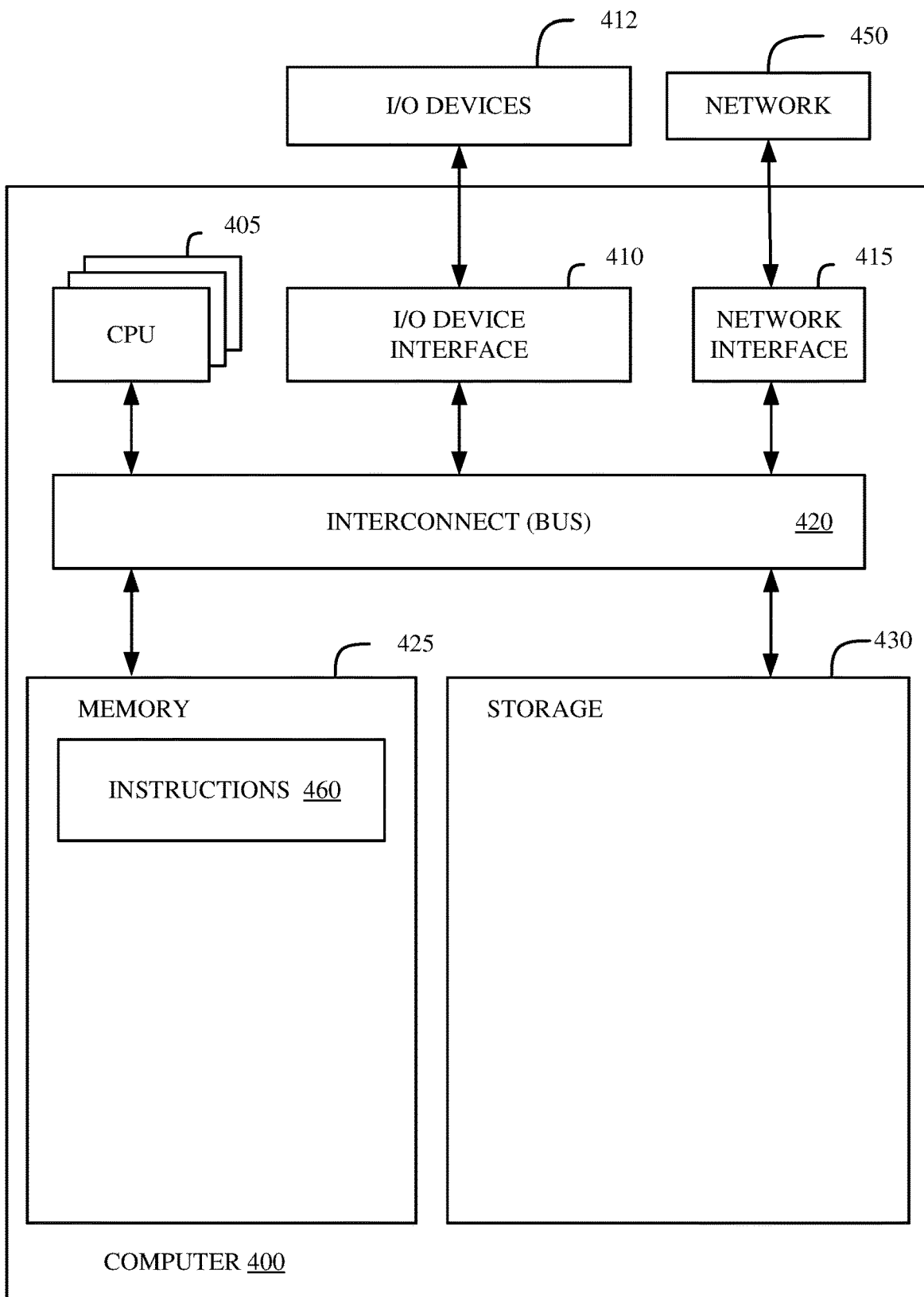
FIG. 4 illustrates a block diagram of an example computer, in accordance with some embodiments of the present disclosure.

FIG. 4 illustrates a block diagram of an example computer 400 in accordance with some embodiments of the present disclosure. In various embodiments, computer 400 can perform the methods described in FIG. 3 and/or implement the functionality discussed in FIGS. 1 and 2A-2B. In some embodiments, computer 400 receives instructions related to the aforementioned methods and functionalities by downloading processor-executable instructions from a remote data processing system via network 450. In other embodiments, computer 400 provides instructions for the aforementioned methods and/or functionalities to a client machine such that the client machine executes the method, or a portion of the method, based on the instructions provided by computer 400. In some embodiments, the computer 400 is incorporated into offline device 102, delegate device 104, and/or server 106.

Computer 400 includes memory 425, storage 430, interconnect 420 (e.g., BUS), one or more CPUs 405 (also referred to as processors herein), I/O device interface 410, I/O devices 412, and network interface 415.

Each CPU 405 retrieves and executes programming instructions stored in memory 425 or storage 430. Interconnect 420 is used to move data, such as programming instructions, between the CPUs 405, I/O device interface 410, storage 430, network interface 415, and memory 425. Interconnect 420 can be implemented using one or more busses. CPUs 405 can be a single CPU, multiple CPUs, or a single CPU having multiple processing cores in various embodiments. In some embodiments, CPU 405 can be a digital signal processor (DSP). In some embodiments, CPU 405 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 425 is generally included to be representative of a random-access memory (e.g., static random-access memory (SRAM), dynamic random access memory (DRAM), or Flash). Storage 430 is generally included to be representative of a non-volatile memory, such as a hard disk drive, solid state device (SSD), removable memory cards, optical storage, or flash memory devices. In an alternative embodiment, storage 430 can be replaced by storage area-network (SAN) devices, the cloud, or other devices connected to computer 400 via I/O device interface 410 or network 450 via network interface 415.

In some embodiments, memory 425 stores instructions 460. However, in various embodiments, instructions 460 are stored partially in memory 425 and partially in storage 430, or they are stored entirely in memory 425 or entirely in storage 430, or they are accessed over network 450 via network interface 415.

Instructions 460 can be processor-executable instructions for performing any portion of, or all of, any of the method of FIG. 3 and/or implementing any of the functionality discussed in FIGS. 1 and 2A-2B.

In various embodiments, I/O devices 412 include an interface capable of presenting information and receiving input. For example, I/O devices 412 can present information to a user interacting with computer 400 and receive input from the user.

Computer 400 is connected to network 450 via network interface 415. Network 450 can comprise a physical, wireless, cellular, or different network.

Embodiments of the present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or subset of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any of the instructions stored in instructions 460 of FIG. 4 and/or any software configured to perform any subset of the methods described with respect to FIG. 3 and/or any of the functionality discussed in FIGS. 1 and 2A-2B) can be deployed by manually loading it directly in the client, server, and proxy computers via loading a storage medium such as a CD, DVD, etc., the process software can also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention can also be delivered as part of a service engagement with a client corporation, nonprofit organization, government entity, internal organizational structure, or the like. These embodiments can include configuring a computer system to perform, and deploying software, hardware, and web services that implement, some or all of the methods described herein. These embodiments can also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing (e.g., generating an invoice), or otherwise receiving payment for use of the systems.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding of the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A computer-implemented method comprising:
    receiving, at a server and from a delegate user device, a delegate login package comprising an offline token and delegate credentials, wherein the offline token is generated at an offline user device and transmitted to the delegate user device for enabling the delegate user device to access access-controlled content associated with the offline user device;
    validating, by the server, the delegate login package by comparing the delegate credentials with delegate information stored in the offline token;
    establishing a delegated session between the delegate user device and the access-controlled content stored on the server in response to validating the delegate login package, wherein the delegated session is established according to an access policy, delegation rights, and an expiration parameter stored in the offline token; and
    terminating the delegated session according to the expiration parameter.

2. The method of claim 1, wherein the offline token is transmitted from the offline user device to the delegate user device by a text message.

3. The method of claim 1, wherein the offline token is transmitted from the offline user device to the delegate user device by a personal-area network (PAN).

4. The method of claim 1, wherein the offline token stores account information comprising an account identifier identifying a user account related to the access-controlled content on the server, and the account information further comprises a password associated with the user account.

5. The method of claim 4, wherein the delegate information stored in the offline token includes an identifier of the delegate user device selected from a group consisting of: a name, a phone number, an account number, and an email address.

6. The method of claim 5, wherein the access policy limits viewable information in the access-controlled content during the delegated session.

7. The method of claim 6, wherein the delegation rights limit executable operations on the access-controlled content during the delegated session.

8. The method of claim 1, wherein the expiration parameter comprises a time-based expiration, and wherein the delegated session is terminated in response to a current time exceeding an expiration time.

9. The method of claim 1, wherein the expiration parameter comprises a location-based expiration, and wherein the delegated session is terminated in response to the delegate user device moving to a location outside of the location-based expiration.

10. The method of claim 1, wherein the expiration parameter comprises a usage-based expiration, and wherein the delegated session is terminated in response to the delegate user device performing a predefined operation on the access-controlled content.

11. A computer program product comprising a computer readable storage medium having program instructions embodied therewith, the program instructions executable by a processor to cause the processor to perform a method comprising:
    receiving, at a server and from a delegate user device, a delegate login package comprising an offline token and delegate credentials, wherein the offline token is generated at an offline user device and transmitted by text message to the delegate user device for enabling the delegate user device to access access-controlled content associated with the offline user device;
    validating, by the server, the delegate login package by comparing the delegate credentials with delegate information stored in the offline token; and
    establishing a delegated session between the delegate user device and the access-controlled content stored on the server in response to validating the delegate login package, wherein the delegated session is established according to an access policy, delegation rights, and an expiration parameter stored in the offline token.

12. The computer program product of claim 11, wherein the offline token is transmitted from the offline user device to the delegate user device by a personal-area network (PAN).

13. The computer program product of claim 11, wherein the offline token stores account information comprising an account identifier identifying a user account related to the access-controlled content on the server, and the account information further comprises a password associated with the user account;
    wherein the delegate information stored in the offline token includes an identifier of the delegate user device selected from a group consisting of: a name, a phone number, an account number, and an email address;
    wherein the access policy limits viewable information in the access-controlled content during the delegated session; and wherein the delegation rights limit executable operations on the access-controlled content during the delegated session.

14. The computer program product of claim 11, wherein the method further comprises:
terminating the delegated session according to the expiration parameter.

15. The computer program product of claim 14, wherein the expiration parameter comprises a time-based expiration, and wherein the delegated session is terminated in response to a current time exceeding an expiration time.

16. The computer program product of claim 14, wherein the expiration parameter comprises a location-based expiration, and wherein the delegated session is terminated in response to the delegate user device moving to a location outside of the location-based expiration.

17. The computer program product of claim 14, wherein the expiration parameter comprises a usage-based expiration, and wherein the delegated session is terminated in response to the delegate user device performing a predefined operation on the access-controlled content.

18. A system comprising:
a processor; and
a computer-readable storage medium storing program instructions which, when executed by the processor, are configured to cause the processor to perform a method comprising:
receiving, at a server and from a delegate user device, a delegate login package comprising an offline token and delegate credentials, wherein the offline token is generated at an offline user device and transmitted by a personal area network (PAN) to the delegate user device for enabling the delegate user device to access access-controlled content associated with the offline user device;
validating, by the server, the delegate login package by comparing the delegate credentials with delegate information stored in the offline token; and
establishing a delegated session between the delegate user device and the access-controlled content stored on the server in response to validating the delegate login package, wherein the delegated session is established according to an access policy, delegation rights, and an expiration parameter stored in the offline token.

19. The system of claim 18, wherein the offline token stores account information comprising an account identifier identifying a user account related to the access-controlled content on the server, and the account information further comprises a password associated with the user account.

20. The system of claim 18, wherein the method further comprises:
terminating the delegated session according to the expiration parameter.

* * * * *